United States Patent [19]

Kressmann

[11] 3,998,398
[45] Dec. 21, 1976

[54] APPARATUS WINDING ENDLESS BANDS OF FILM ON HUBS OF SPOOLS

[76] Inventor: Didier Kressmann, 43 rue de Chaillot, 75016 Paris, France

[22] Filed: Nov. 19, 1975

[21] Appl. No.: 633,383

[52] U.S. Cl. .............................. 242/55.16; 352/128
[51] Int. Cl.² ........................................ G03B 21/00
[58] Field of Search ......... 242/55.16, 55.17, 55.19, 242/86.1, 107.13; 352/126, 128

[56] References Cited

UNITED STATES PATENTS

| | | | |
|---|---|---|---|
| 1,308,293 | 7/1919 | Maggard | 242/55.16 |
| 3,139,240 | 6/1964 | Weber, Jr. | 242/55.16 |
| 3,592,402 | 7/1971 | Westberg | 242/55.16 |
| 3,923,266 | 12/1975 | Boyer | 242/55.16 |

*Primary Examiner*—Leonard D. Christian
*Attorney, Agent, or Firm*—Haseltine, Lake & Waters

[57] ABSTRACT

A mechanism for winding endless bands of film on a hollow hub which is open at one side thereof and has a circumferential rim. The rim is provided with a plurality of apertures and a pivotal arm with a finger thereon engages the film to introduce the same into the hub through one of the apertures to form a loop of film within the hub. A guide cam is mounted on the rim adjacent each aperture for engaging the finger when the latter is offset from the respective aperture to pivot the hub so the finger can be smoothly and directly introduced into the aperture. A drive is obtained through two electro-magnetic clutches by means of one motor. The winding spool turns opposite the unwinding spool, in order to use a clutch as both a brake or a coupling, depending on whether the spool is a winding spool or an unwinding spool.

14 Claims, 8 Drawing Figures

APPARATUS WINDING ENDLESS BANDS OF FILM ON HUBS OF SPOOLS

FIELD OF THE INVENTION

The invention relates to apparatus for winding endless bands on hubs and particularly for winding endless bands of film onto the hub of a take-up spool.

BACKGROUND AND PRIOR ART

The invention is concerned with endless band winding systems of the type disclosed in U.S. Pat. Application Ser. No. 429,976 filed by J. Boyer on Dec. 12, 1973, now U.S. Pat. 3,923,266 the contents of which are incorporated by reference herein. Similar winding systems are also found in U.S. Pat. Nos. 1,308,293 (Maggard), 3,592,402 (Westberg) and 3,139,240 (Weber).

In these systems, a continuous endless band is successively wound from one spool or reel to another while being continuously fed through a utilization device such as a projector or the like. When the band is emptied from the supply reel, the band is fed back to the empty reel and the latter is thereafter driven in reverse to become the take-up reel. To effect the feed of the band back onto the empty reel, a finger on a pivotal lever or arm engages the band and feeds the band onto the hub of the empty reel and holds it thereon until the reel has rotated several turns whereafter the finger is retracted and continued rotation of the reel causes the band to be wound thereon.

While reference is made to a band, this can be a film, tape, wire or other endless length of material.

SUMMARY OF THE INVENTION

An object of the invention is to provide improvements in endless band winding apparatus of the known type by which the band or film is efficiently and accurately placed on the hub of an empty take-up spool.

More particularly, the invention is directed to the combination of a hub and a mechanism for winding endless bands of film on said hub, said hub being hollow and open at one side thereof, and including a circumferential rim, said rim being provided with a plurality of apertures, said mechanism including a pivotal arm with a finger thereon, said finger being adapted for engaging the film and being introducible into the hub through one of said apertures thereof to form a loop of film within said hub, and cam means on said rim adjacent said apertures for engaging said finger when the latter is offset from the respective said aperture to pivot the hub so the finger can be smoothly and directly introduced into the aperture.

According to the invention, the cam means comprises a cam adjacent each aperture having the shape of an involute of a circle.

The invention further contemplates the provision of positive stop means for locating the position of the finger at the center of the hub.

The stop means includes a fixed stop member positioned to halt the arm at a location at which the finger is at the center of the hub, the mechanism further comprising means for driving said arm to a position slightly beyond the stop member and damper means for accommodating the additional drive of the arm.

Preferably the damper means is inclusive of a resilient element.

In further accordance with the invention, the mechanism further comprises support means supporting said finger from said arm for movement between a retracted inoperative position and an extended operative position, and actuator means for moving the finger between said operative and inoperative positions.

The invention further comtemplates drive means for the hub including a drive motor and an electromagnetic clutch coupling. The clutch coupling includes an electromagnet and a Darlington amplifier controlling operation of the electromagnet. The Darlington amplifier is supplied with unfiltered rectified current.

BRIEF DESCRIPTION OF THE DRAWING

FIG. 1b is a section through the structure taken along line 16—16 in FIG. 1a;

DETAILED DESCRIPTION

Figure 1A:
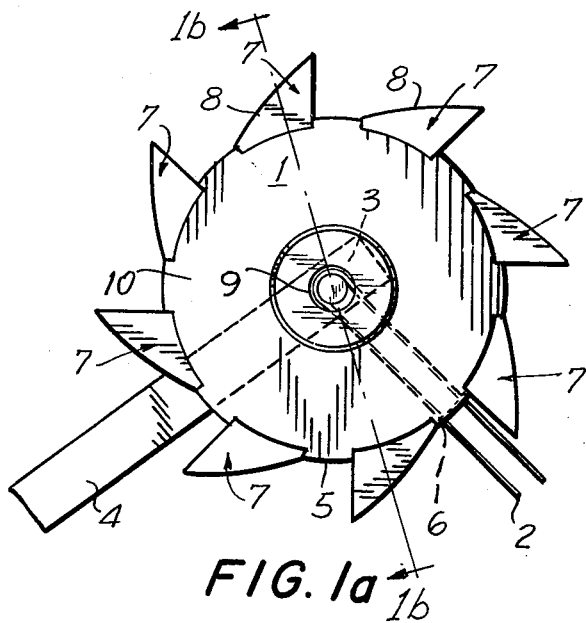
FIG. 1a is a side elevation view of a hollow empty reel showing the introduction of a loop of film thereinto for the winding of the film into the hub of the reel, the drive shaft being omitted for purposes of clarity.
Figure 1B:
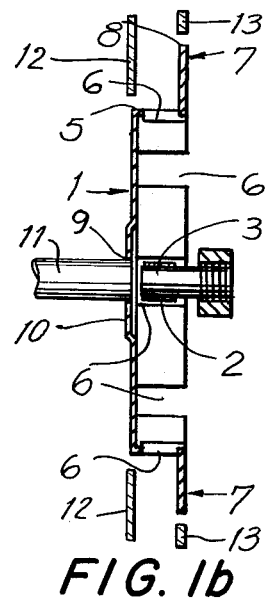

Referring to FIGS. 1a and 1b, therein is seen an empty hub 1 onto which a loop of endless film 2 is to be wound. As has been explained above in the background and description of the prior art, this situation arises in endless film winding systems when the film is wound off the supply reel and the now empty supply reel receives the film and is subsequently driven in reverse to become the take-up reel, the film being engaged by a finger 3 on a feed arm 4 to bring the film to the hub of the empty reel so that the film will be wound on the hub during reverse drive thereof. Heretofore, such reels have been of complex form and required careful coordination with the finger for loading of the film on the hub.

Figure 6:
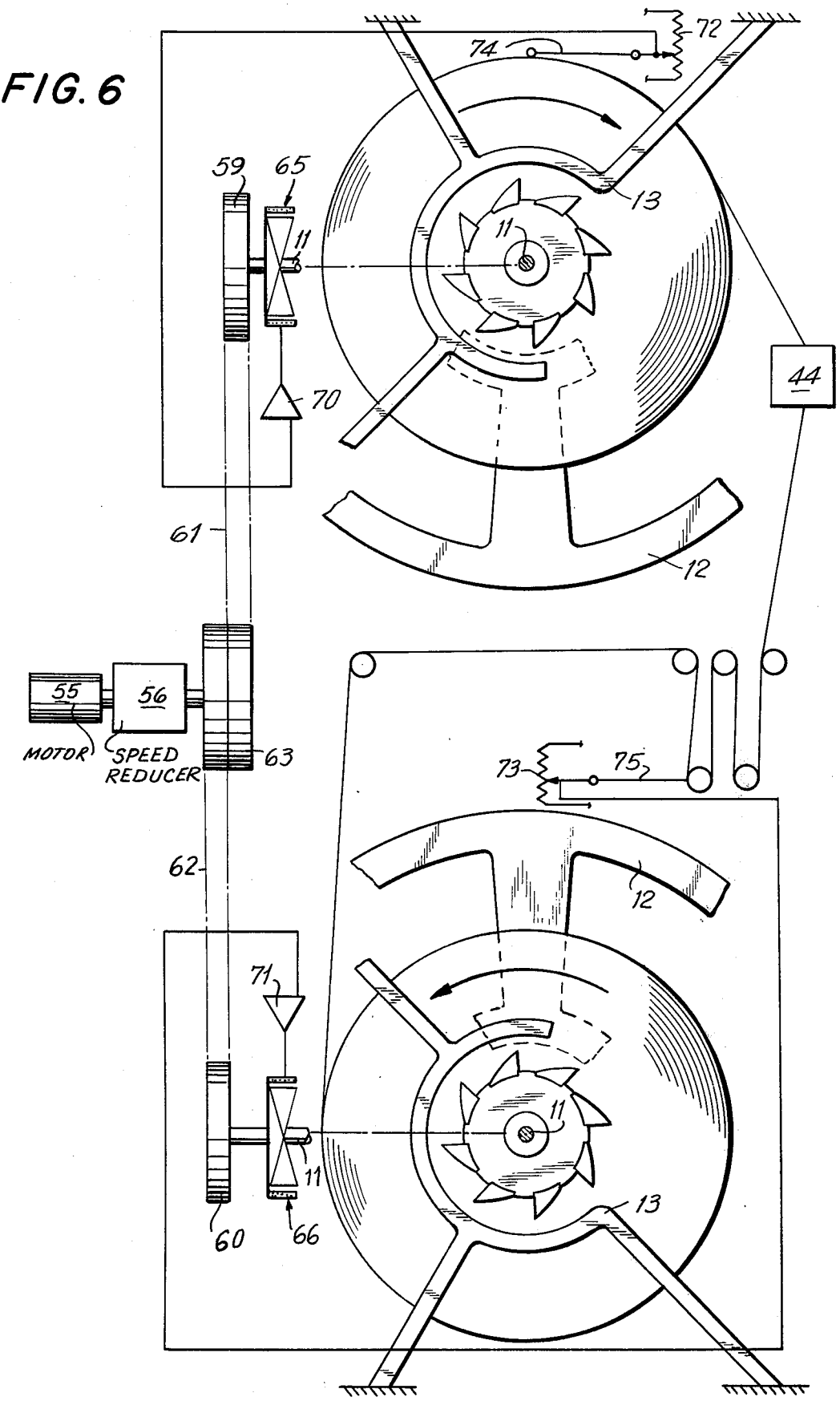
FIG. 6 is a diagrammatic illustration of the driving and braking system for the spools, the spools being rotated 90° for purposes of explanation.

In the construction according to the invention, the hub 1 of the reel is entirely hollow and is open at one side and provided at its periphery with a circumferential rim 5 having a plurality of apertures or slots 6 of, for example, 3 to 10 in number. In the illustrated embodiment, eight such apertures have been shown. The apertures 6 permit the passage of finger 3 with the loop of film thereon, from a position outside the hub to a position at the center of the hub, during pivotal movement of feed arm 4. In the position as shown in FIG. 1a, rotation of the reel will cause the film to be wound on the hub and after several turns of the hub, the film will be self-sustaining thereon and the finger 3 can be retracted from the hub and the arm 4 moved to a neutral position in readiness for acting on the other reel when the film supply is exhausted therefrom. The hub 1 has an aperture 9 in its side wall 10 to receive a drive shaft 11. As is conventional, side elements are employed on the projector or other utilization means for preventing spill-off of the film on the hub. By way of example, a conventional side cheek 12 is mounted around shaft 11 at the left of hub 1 and held in position so as to be adjacent the hub when the latter is mounted on shaft 11. A guard 13 is mounted on the machine at the right of the hub and is of the form as shown in FIG. 6 to permit free movement of arm 4 towards and away from the hub while retaining the film thereon.

In order to facilitate passage of the operative finger carrying the film through an aperture 6, a number of cams 7 are provided each adjacent a respective aperture. The cams serve to position one of the apertures 6 exactly in front of the finger 3 so that the finger can be passed into the hub. The finger is brought into the hub when the latter is in a free-wheeling condition before it is driven in reverse to act as the take-up spool. Each cam 7 has a cam surface 8 shaped as the involute of a circle which permits the loading finger 3, in whatever position it strikes a surface 8, to cause the hub to pivot at most a few degrees to enable the finger 3 and the loop of film 2 thereon to directly and smoothly pass into the hollow center of the hub via associated aperture 6. The hub is thereafter driven in rotation to serve as the take-up reel according to the conventional program associated with the known film winding system.

Figure 2A:
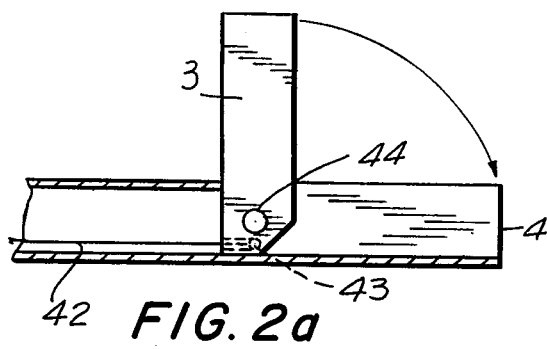
FIG. 2a is a detail view which shows a finger on the end of a feed arm in raised operative position.
Figure 2B:
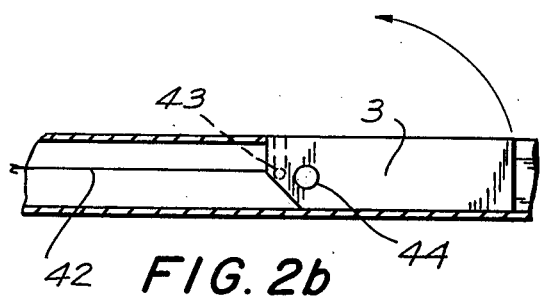
FIG. 2b is a detail view which shows the finger in lowered retracted position.
Figure 4:
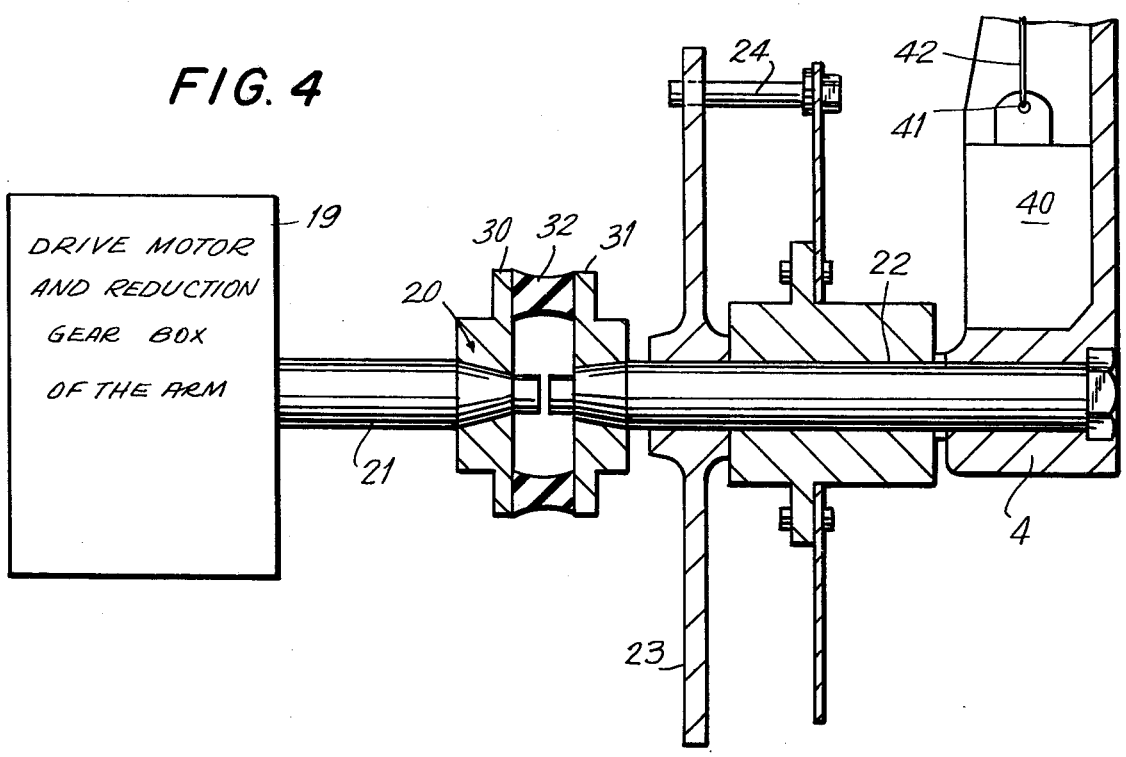
FIG. 4 is a sectional view showing apparatus for driving the feed arm.

The finger 3 is stopped at the center of the hub by a suitable stop means acting on the feed arm 4. Despite the use of a conventional brake motor to move arm 4, the position of the finger 3 at the center of the hub is not always assured. FIG. 4 shows a suitable drive arrangement for the feed arm 4 to achieve such precision of the finger in the hub. The drive arrangement comprises a drive means 19 constituted by a drive motor and speed reduction box. In the drive arrangement, a flexible coupling or damper 20 is interposed between the output shaft 21 of the drive means and drive axle 22 of the feed arm 4. A stationary flange 23 fixed to the frame of the apparatus is positioned to halt a stop member 24 secured on axle 22 thereby to halt the arm 4. The control acting on the drive means 19 is arranged to drive the output shaft 21 to a position beyond the stop position established by flange 24 and stop member 23. A switch means for control of the arm position is independent of the damper and is located on the input side of the reduction gear box. The damper is constructed to provide an angular shifting of 10° to 15° between the output shaft 21 and the drive axle 22. By setting the sequence of the switch means so that the drive means 19 acts to drive the axle 22 through a position slightly beyond the engagement of stop member 23 with flange 24, it is assured that the feed arm 4 will reach the position in which finger 3 is at the center of the hub, the excess angular position of shaft 21 with respect to axle 22 being taken up by the deformation of the flexible elements of the damper. In the present case, the damper 20 comprises flanges 30, 31 respectively affixed to shaft 21 and axle 22 and an annular resilient element 32 is secured to flanges 30, 31. When flange 30 is rotated beyond the stop position established by stop member 23, the resilient element 32 is torsionally deformed. The torsional deformation is effected by stressing resilient element 32 made of rubber or the like, however, this could also be achieved by spring action. A precise locked position is then obtained for the finger 3 by engagement of stop member 23 with flange 24 on the one hand and by torsional deformation of resilient element 23 on the other hand. The loop of film 2 thereby is introduced at the center of the hub and after this position is reached, the hub is driven and after several revolutions of said hub, an electromagnet 40 carried on the arm 4 is actuated to cause displacement of a plunger 41 of the electromagnet and retraction of finger 3. For this purpose, plunger 41 of electromagnet 40 is connected by wire 42 to finger 3 at a pin 43 offset from the pivot connection 44 of finger 3 to arm 4 and actuation of electromagnet 40 successively produces unlocking of the finger 3 by compression of a spring (not shown) and pivotal movement of the finger to the retracted position shown in FIG. 2b where the arm is latched. In such retracted position, the film is now free within the hub and the arm 4 is moved to its neutral position.

Figure 3:
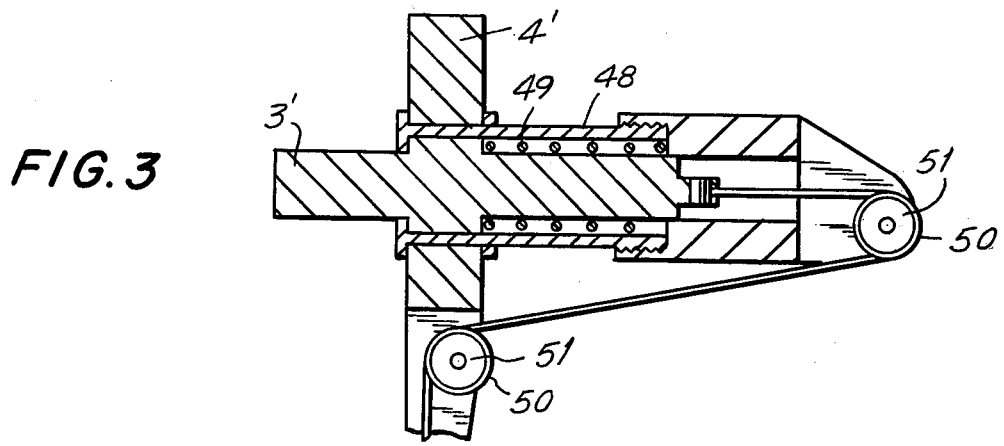
FIG. 3 is a detail view which shows a modified arrangement of the feed arm and the finger.

An improved mechanism according to the invention for retracting the finger is shown in FIG. 3. Therein finger 3' is slidably engaged in a guide bushing 48 and is urged by a spring 49 to an extended operative position out of guide bushing 48 as shown. A chain 50 is connected to finger 3' and to the plunger of the electromagnet, the chain being wound on pulleys 51 mounted on the structure of arm 4'. Hence when electromagnet 40 is actuated, the finger 3' is retracted, against the action of spring 49, to its inoperative position and when electromagnet 40 is deactuated, the finger 3' is extended from guide bushing 48.

The novel film feed system of the invention permits the use of an arm of relatively short length which is considerably reduced in weight due to:

a. the elimination of the pivot system for retracting the finger,
b. the elimination of the conventional sliding part on which the finger was fixed in the conventional system,
c. the elimination of guide blades for guiding the finger into notches in the hub of the conventional system.

The construction of the means according to the invention is considerably simplified and gives much greater reliability as compared to the mechanical elements of the conventional systems in the prior art as referred to earlier in the Application.

The spools are driven in rotation by means of a construction shown in FIG. 6 wherein the drive shafts 11 carry pulleys 59, 60 which are driven by respective belts 61, 62, from a single pulley 63 driven from an electric motor-reducer drive unit 55, 56. Each drive shaft 11 includes a respective electro magnetic clutch coupling 65, 66 which can serve either as a drive coupling or as a brake depending on the corresponding function of the spool. The clutch couplings can be controlled by an electronic system of conventional design wherein the torque transmitted through the coupling is a function of the feed current. Such feed current can be supplied by respective Darlington amplifiers with a DC gain of 1000 within the range of 10 MAmp to 1 amp.

The feed of the input currents to the amplifiers is effected via respective divider bridges in the form of potentiometers 72, 73 as variable control elements. The potentiometer 72 is coupled to a first arm 74 sensing the diameter of the film on the braked spool 1 and is coupled to coupling 65 through the Darlington amplifier 70. Potentiometer 73 is coupled to a second arm 75 detecting the tension between the output of projector 44, and the input of driven spool 2. The potentiometer 73 is connected to coupling 66 through the Darlington amplifier 71.

When the functions of the spools are reversed, the electric program also reverses the functions of the couplings. Therefore, a third arm not shown but similar to arm 74 and a third potentiometer (not shown) similar to potentiometer 72 are associated with spool 2, while potentiometer 72 is cut-off.

Current supply is effected with non-filtered rectified current thereby eliminating electrochemical capacitors and the need for feedback for reasons of reliability.

Figure 5:
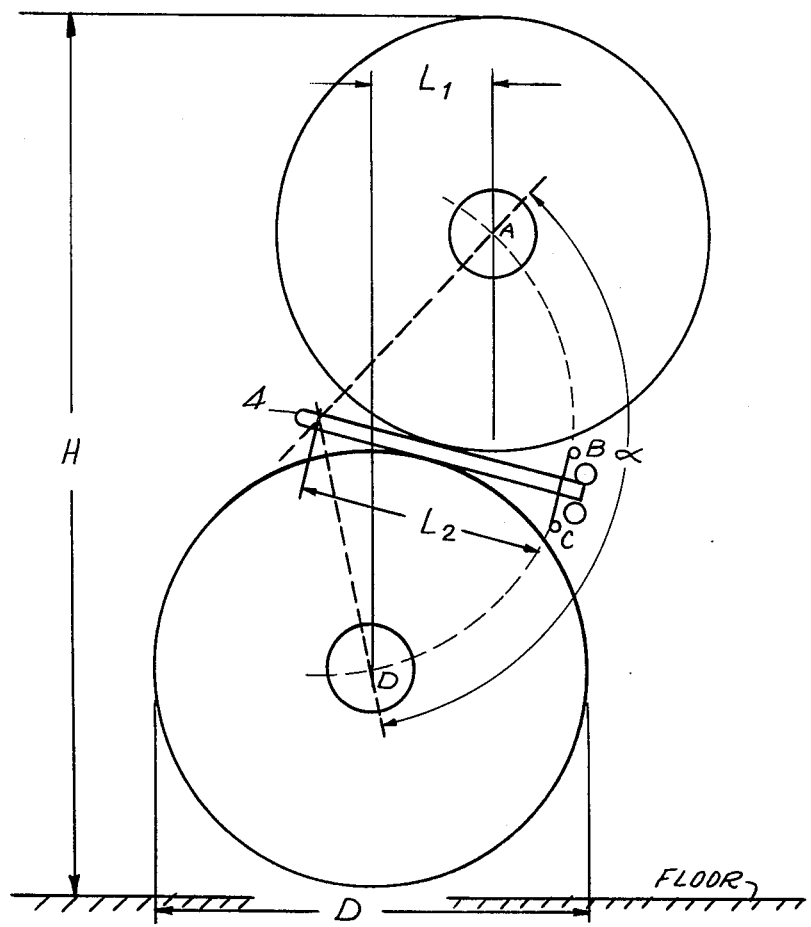
FIG. 5 is a diagrammatic illustration showing the arrangement of two reels and the feed arm.

FIG. 5 shows the relative positions of the spools and the feed arm 4. As seen, arm 4 pivots through an angle $\alpha$ and is capable of being brought to two extreme positions A and D (shown in dotted lines) in which the finger on the arm can be brought into registry with the center of the hub of each spool in the manner as previously explained. The neutral positions of the arm 4 is indicated at B and C respectively for the upper and lower reels.

The relative position of the axes of the two spools, the position of stoppage in order to load the film either on the upper spool or the lower spool, as well as the pivot center and length $L_2$ of the arm 4 are determined according to the required diameter D of the spool.

In order to minimize the head room H in the projection cabin for a given spool capacity, it is possible to axially shift the spool axes by distance $L_1$ as a function of the capacity of storage of required film on the spool.

What is claimed is:

1. In combination, a hub and a mechanism for winding endless bands of film on said hub, said hub being hollow and open at one side thereof and including a circumferential rim, said rim being provided with a plurality of apertures, said mechanism including a pivotal arm with a finger thereon, said finger being adapted for engaging the film and being introducible into the hub through one said aperture thereof to form a loop of film within said hub, and cam means on said rim adjacent said apertures for engaging said finger when the latter is offset from the respective said aperture to pivot the hub so the finger can be smoothly and directly introduced into the aperture.

2. The combination as claimed in claim 1 wherein said cam means comprises a cam adjacent each aperture and having the shape of an involute of a circle.

3. The combination as claimed in claim 1 comprising positive stop means for locating the position of said finger at the center of the hub.

4. The combination as claimed in claim 3 wherein said stop means includes a fixed stop member positioned to halt the arm at a location at which the finger is at the center of the hub, the mechanism further comprising means for driving said arm to a position slightly beyond the stop member and damper means for accommodating the additional drive of the arm.

5. The combination as claimed in claim 4 wherein said damper means includes a resilient element.

6. The combination as claimed in claim 1 wherein said mechanism further comprises support means supporting said finger from said arm for movement between a retracted inoperative position and an extended operative position, and actuator means for moving the finger between said operative and inoperative positions.

7. The combination as claimed in claim 6 wherein said support means includes a pivot for said finger, said actuator means comprising an electromagnet on said arm and a wire connecting said electromagnet to said finger to retract the same to its inoperative position aligned with the arm.

8. The combination as claimed in claim 6 wherein said support means comprises a guide bushing on said arm slidably supporting said finger, spring means acting on said finger urging the same to its extended operative position, an electromagnet on said arm, and means connecting said electromagnet and said finger for retracting said finger against the action of said spring means when the electromagnet is actuated.

9. The combination as claimed in claim 8 wherein the means connecting the electromagnet and the finger comprises a chain.

10. The combination as claimed in claim 1 comprising drive means for said hub including an electromagnet clutch coupling.

11. The combination as claimed in claim 10 wherein said clutch coupling includes an electromagnet and a Darlington amplifier controlling operation of the electromagnet.

12. The combination as claimed in claim 11 wherein the Darlington amplifier is supplied with unfiltered rectified current.

13. The combination as claimed in claim 1 wherein two spools are provided each with one of said hubs, the spools being disposed above one another, and axially offset.

14. The combination as claimed in claim 1 wherein two hubs are provided respectively and successively serving for supply and take-up of film thereon, drive means being provided for driving said hubs in rotation and including a single drive motor and means coupling the drive motor to said hubs in driving relation.

* * * * *